United States Patent [19]

Bedard

[11] 4,031,754

[45] June 28, 1977

[54] APPARATUS FOR WEATHER PREDICTION

[76] Inventor: James Charles Bedard, 22 Foster Lane, Westbury, N.Y. 11590

[22] Filed: Jan. 19, 1976

[21] Appl. No.: 650,051

[52] U.S. Cl. ............................................... 73/188
[51] Int. Cl.² ........................................ G01W 1/00
[58] Field of Search ........................... 73/188, 189

[56] References Cited

UNITED STATES PATENTS

| | | | |
|---|---|---|---|
| 2,266,172 | 12/1941 | Davis | 73/188 X |
| 3,323,130 | 5/1967 | Bailey | 73/188 X |
| 3,678,485 | 7/1972 | Jones | 73/188 X |

Primary Examiner—Jerry W. Myracle
Attorney, Agent, or Firm—Robert T. Tobin

[57] ABSTRACT

The disclosure is for apparatus which uses wind direction information from any rotary contact wind vane to generate electrical signals corresponding to forecasts of weather. The electrical signals are used to light indicator lamps on a panel located inside the building thereby giving a visual indication of predicted weather.

7 Claims, 3 Drawing Figures

U.S. Patent
June 28, 1977
4,031,754
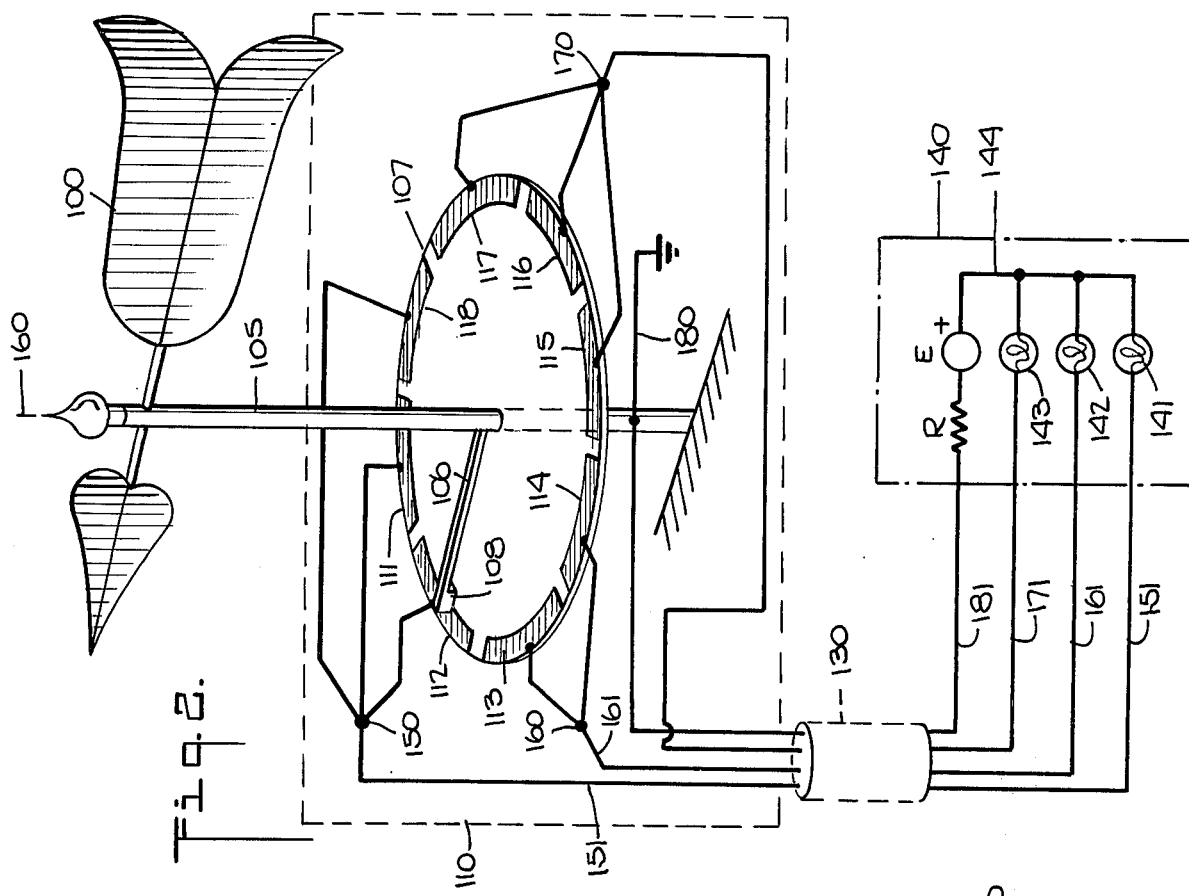
Fig. 2.
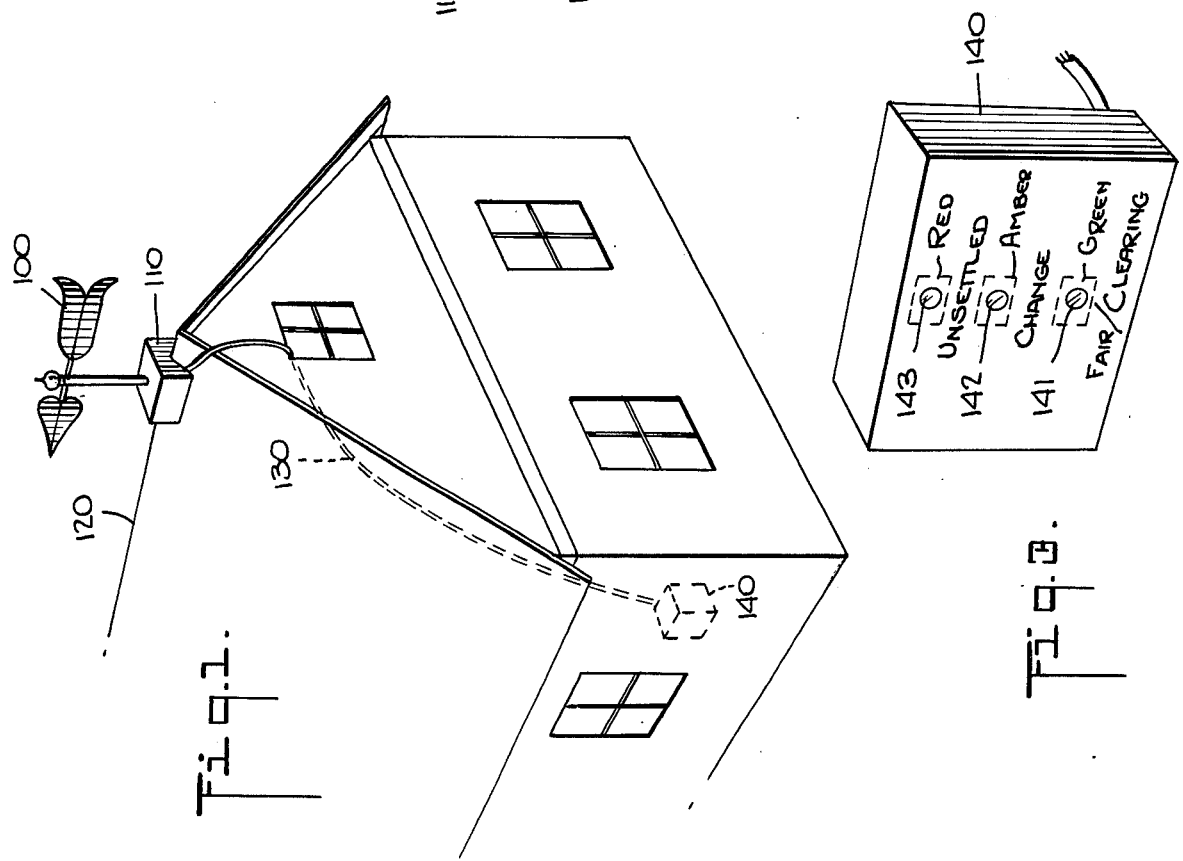
Fig. 1.
Fig. 3.

4,031,754

APPARATUS FOR WEATHER PREDICTION

BACKGROUND OF THE INVENTION

This invention relates generally to the field of weather prediction. Specifically, the invention relates to weather prediction from present wind direction observations only, no other atmospheric parameter being used.

The general field of weather forecasting and prediction has become a highly sophisticated art. It is well known that the atmosphere can be described as a three dimensional model, consisting of highly interrelated weather systems of wind, pressure, temperature, humidity, cloudiness, precipitation, and visibility. Governmental agencies spend vast sums of money for weather system modeling, data collection, and prediction techniques in order to predict local and even global weather conditions. It has been found over the years that local weather prediction can be economically accomplished by simply using data on a few or even one of the parameters of current local weather. A single parameter often used for local weather prediction is atmospheric pressure. The barometer of course is a well known instrument, measuring but one parameter of local weather systems-atmospheric pressure-for local weather prediction. The barometer is useful as a weather prediction tool because atmospheric pressure varies with the intensity of cyclonic and anticyclonic weather systems which move across the earth. Local observations of cloud type combined with measurement of barometric pressure has been a more accurate but more complicated way to obtain data for the prediction of local weather.

It has been found that a more reliable indicator of short term future local weather conditions is wind direction alone. Weather prediction by wind direction is less likely to be affected by variations of diurnal pressure or by clouds caused by thermal radiation.

It is an object of this invention to provide apparatus for predicting local weather conditions.

It is another object of this invention to provide an economical alternative to the measurement of atmospheric pressure for local weather prediction.

It is another object of this invention to provide apparatus for sensing wind direction information for use in predicting local weather conditions.

It is another object of this invention to provide a visual indication of local weather prediction inside a building based solely on outside wind direction information obtained from the top of the building.

SUMMARY OF THE INVENTION

The invention is concerned with apparatus for the prediction of local weather conditions based solely on present wind direction. A device for determining wind direction, for example, a wind vane is provided for mounting on top of a building or other high location, the wind vane providing a physical indication of the present wind direction. Associated with the wind direction device or wind vane is an electrically grounded rotary contact vane or wiper arm and contact arrangement for closing a plurality of electrical circuits, each circuit corresponding to a particular wind direction. Certain combinations of the electrical contacts are electrically connected to yield three circuits, one circuit associated with fair weather prediction, another for changing weather prediction, and another for unsettled weather prediction, each circuit being connected to a common source of electrical potential. Each of the three circuits has an individual light bulb or light emitting diode (LED) connected in it, all three of the bulbs or LEDs being mounted in a display cabinet for placement within the building. The light bulbs give a visual indication of predicted weather conditions according to the particular illuminated bulb or LED which corresponds to a particular wind direction. In a preferred embodiment of the invention for use in the northeast states, contacts associated with north, northwest and west wind directions are electrically connected, and when the wiper arm connected to the wind vane makes electrical contact with any one of them, the electrical circuit is closed thereby lighting the bulb or LED in the fair weather prediction circuit. Similarly contacts associated with south and southwest wind directions are coterminated in the circuit associated with a prediction for changing weather. Contacts associated with southeast, east, and northeast wind directions are coterminated in the circuit associated with a prediction for unsettled weather.

BRIEF DESCRIPTION OF THE DRAWINGS

This invention, as well as its objects and features, will be better understood by reference to the following detailed description of the preferred embodiment of this invention taken in conjunction with the accompanying drawings in which:

FIG. 1 shows a wind vane attached atop a building and connected by means of an electrical cable to an indicating panel located within the building according to the invention, FIG. 2 shows schematically the electrical circuits which are closed as the wiper arm attached to a wind vane touches contacts arranged on a circular plate associated with the wind vane, and FIG. 3 shows an indicating panel specifically located within said building according to the invention.

DESCRIPTION OF THE INVENTION

This invention is based on correlations of seventy-five years of wind data with weather predictions which establishes the fact that it is possible to reliably predict weather conditions based only on current wind directions.

FIG. 1 pictorially demonstrates the context in which the invention is used. A wind vane 100 and an associated control box 110 are attached to a building roof 120, preferably extending over the highest part of the roof 120 so as to be free of wind obstruction of the roof. The control box 110 is connected via electrical cable 130 to air indicator panel 140, preferably located within the building to which the weather vane 100 is attached.

FIG. 2 is a mechanical and electrical schematic drawing which discloses the operation and features of the invention. Wind vane 100 is connected to control box 110 by a shaft 105. Shaft 105 is free to rotate about vertical center line 160 when urged by wind vane 100 during its response to wind forces in any direction. Attached to shaft 105 inside control box 110 is a wiper arm 106 and associated contact block 108 which is aligned with the direction of wind vane 100. When wind vane 100 points in a particular direction, wiper arm 106 points in the identical direction. A circular plate 107 of insulating material such as plastic or rubber is associated with shaft 105. Shaft 105 is free to rotate within a hole in the center of the circular plate 107 about bearings (not shown) within control box 110, which is preferably mounted on the roof of a building as shown in FIG. 1.

Circular plate 107 is coated in segments with conducting material such as copper or aluminum about a concentric ring defined by the locus of contact block 108 at the end of wiper arm 106 as wiper arm 106 completes a 360° rotation about center line 160. Eight segments are provided on circular plate 107 corresponding to the major directions of a compass, e.g. segment 111, north; segment 112, northwest; segment 113, west; segment 114, southwest; segment 115, south; segment 116, southeast; segment 117, east; and segment 118 northeast. Each segment is connected to an electrical conductor or wire.

In a preferred embodiment of this invention, conductors or wires associated with segments 111, 112, and 113 corresponding to the north, northwest and west wind directions are electrically coterminated at a terminal point 150. Conductors associated with segments 114 and 115 corresponding to southwest and south wind directions are electrically coterminated at a terminal point 160. Conductors associated with segments 116, 117 and 118 corresponding to southeast, east and northeast wind directions are electrically coterminated at a point 170. The rotor shaft 105 is electrically connected by means of conductor 180 to an electrical ground, which may advantageously be a lighting ground, if available, on top of the building. Conductors 151, 161, 171 and 181 from termination points 150, 160, 170 and 180 are grouped into a cable 130 of length sufficient to terminate at the indicator panel 140 at a location within the building.

Within indicator panel 140, conductor 151 is connected to one side of an indicator 141, conductor 161 is connected to one side of an indicator 142, and conductor 171 is connected to one side of an indicator 143. Indicators 141, 142, or 143 are preferably light emitting diodes (L.E.D.), but may be any device which emits light when energized by a low voltage, such as a small light bulb. The other sides of indicators 141, 142, and 143 are electrically coterminated at common point 144. Conductor 181 which is connected to the ground 180 and rotor 105 is connected in the indicator panel 140 through a current limiting resistor R to one side of a source of voltage E. The other side of the source E is connected to common point 144. The source of voltage E may be a low alternating current voltage obtained by means of a step down transformer connected to an ordinary 120 volt alternating current building line. Alternatively, source E may be a direct-current voltage obtained from a dry-cell storage battery.

The apparatus shown in FIG. 2 functions to light indicator 141 when wind vane 100 and its associated wiper arm 106 and contact 108 are pointing in the north, northwest or west directions. A complete electrical circuit is established from ground 180 via shaft 105, to wiper arm 106 to contact block 108 through one of the conductor segments 111, 112, or 113 via lead 151 through indicator 141 and thence through source E and resistor R. Similarly, indicator 142 is connected to a closed electrical circuit when wind direction forces wind vane 100 in the south or southwest directions. Indicator 143 is connected to a closed electrical circuit when wind direction forces wind vane 100 in the southeast, east, or northeast directions.

FIG. 3 shows pictorially how indicators 141, 142, and 143 may be arranged in indicator 140 to indicate forecasts of weather. A green L.E.D. placed in indicator 141 and bearing a label of "fair/clearing" provides an observer with information at a glance that fair weather conditions are to be expected when indicator 141 is energized. Similarly an amber L.E.D. and a label of "change" provides an observer with information at a glance that changing weather conditions are to be expected when indicator 142 is energized. A red L.E.D. and a label of "unsettled" provides an observer with information at a glance that unsettled weather conditions are to be expected when indicator 143 is energized.

What is claimed is:

1. Apparatus for predicting weather conditions solely on the basis of present wind direction comprising:
   means for producing a physical indication of the present wind direction,
   means responsive to said physical indication of the present wind direction for generating a plurality of signals, each of said signals corresponding to a particular wind direction, and
   means for converting said signals into visual indications of future weather conditions comprising
   means for selectively combining said signals to yield a set of three signals, and
   means responsive to each of said three signals for generating visual indications of weather conditions corresponding to fair, changing or unsettled conditions.

2. The apparatus as in claim 1 wherein said means responsive to said physical indication of the present wind direction generates eight distinct signals corresponding to particular wind directions of north, northwest, west, southwest, south, southeast, east and northeast.

3. The apparatus of claim 1 wherein said means for generating visual indications are light bulbs.

4. The apparatus of claim 1 wherein said means for generating visual indications are light emitting diodes.

5. The apparatus of claim 1 wherein said means for selectively combining said eight distinct signals to yield a set of three signals comprises:
   a first electrical connector having an input terminal for receiving signals corresponding to wind directions of west, northwest, and north and an output terminal for generating a signal corresponding to fair weather conditions,
   a second electrical connector having an input terminal for receiving signals corresponding to wind directions of south and southwest and an output terminal for generating a signal corresponding to changing weather conditions, and
   a third electrical connector having an input terminal for receiving signals corresponding to wind directions of east, southeast, and northeast and an output terminal for generating a signal corresponding to unsettled weather conditions.

6. The apparatus of claim 1 wherein said means for producing a physical indication of the present wind direction is a wind vane.

7. The apparatus of claim 1 wherein said means responsive to said physical indication of the present wind direction from said wind vane comprises:
   a shaft made of electrical conducting material physically connected to said wind vane, a wiper arm and contact block made of electrical conducting material electrically connected to said shaft and physically orientated to point in the same direction as said wind vane, a plate orientated in a plane perpendicular to said shaft, said shaft extending through and being free to rotate within a hole in said plate, said plate made from insulating material which is coated in eight distinct segments with conducting material about a concentric ring defined by the locus of said contact block as said contact block extending on said wiper arm completes a 360° rotation during rotation with the shaft in the center of said plate, a source of electrical voltage connected to said rotor, and conductors extending from each of said segments on said plate.

* * * * *